Patented Dec. 4, 1951

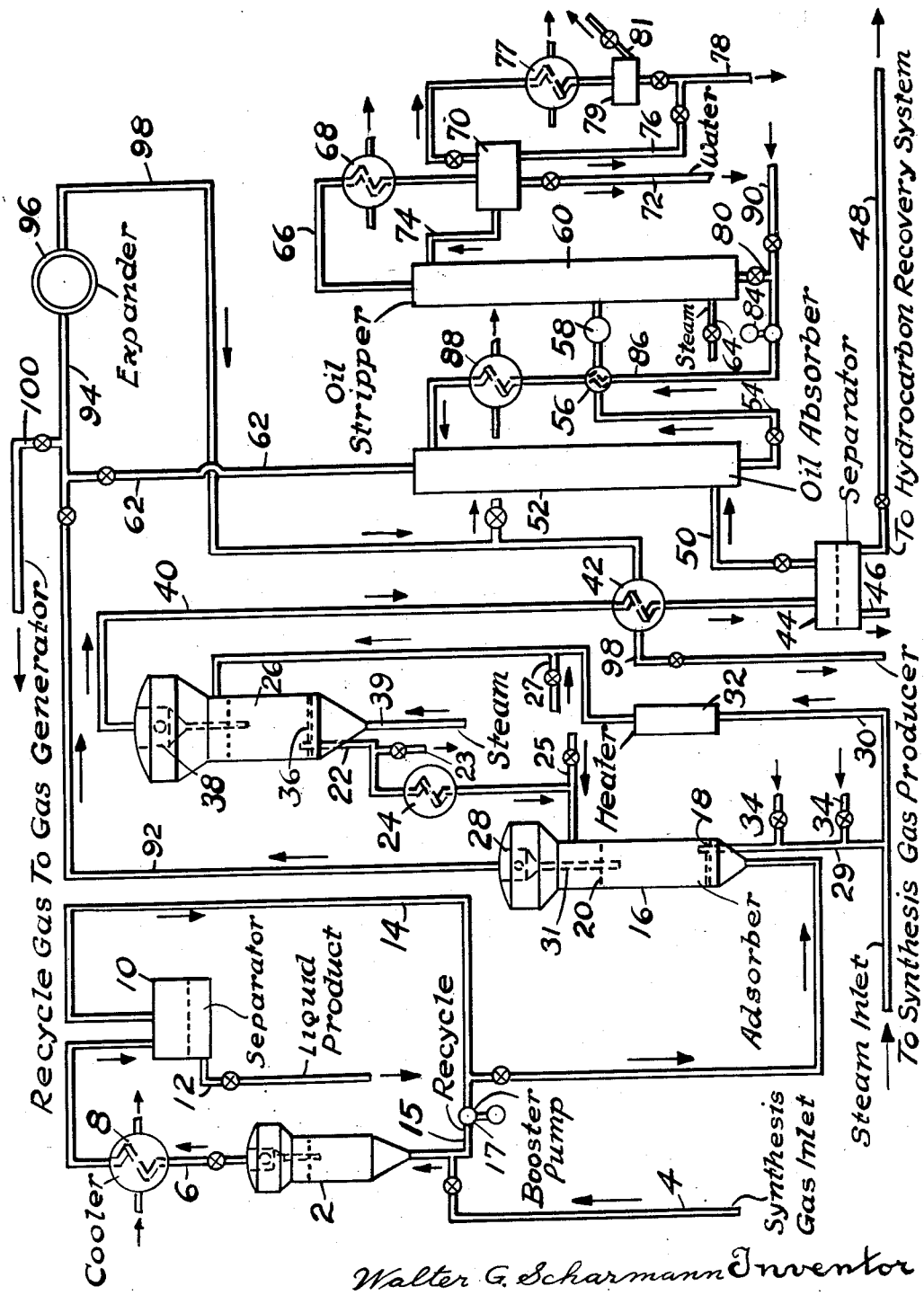

2,577,634

UNITED STATES PATENT OFFICE 2,577,634

RECOVERY OF HYDROCARBONS FROM GASEOUS STREAMS

Walter G. Scharmann, Westfield, N. J., assignor to Standard Oil Development Company, a corporation of Delaware Application October 23, 1948, Serial No. 56,218

7 Claims. (Cl. 260—450)

1

The present invention relates to the catalytic conversion of carbon oxides with hydrogen to form valuable hydrocarbons and oxygenated organic products. More particularly, the present invention relates to an advantageous and novel process for the recovery of uncondensed valuable synthesis products from the hydrocarbon synthesis tail gas.

One of the major problems in the economical operation of hydrocarbon synthesis plants involves the removal of uncondensed lower molecular weight synthesis products from the effluent gases of the reaction system. Compounds ranging in carbon content of from one to nine atoms per molecule are contained in the effluent, or tail gas, in concentrations ranging from about 20-35% depending upon the particular operating conditions and yields. The more valuable $C_2+$ constituents amount to between 1.5 to 2.5 gallons per 1000 standard cubic feet of gas under the more usual processing conditions, and of these constituents a recovery of about 95% is desirable. Most recovery systems are designed to recover all the $C_4+$ materials together with about 80% of the $C_3$ compounds. To effect the necessary absorption by the usual oil absorption technique requires large volumes of circulating oil which necessitates alternate heating and cooling in the cycle of absorbing and desorbing or stripping.

Furthermore, in the oil absorption unit of a hydrocarbon synthesis plant, the characteristics and specifications of the oil have to be particularly considered in relation to the types of compounds to be absorbed from the tail gas. Usually a saturated oil of low molecular weight and low viscosity is desired for this type of processing. In those plants employing iron catalysts, hydrocarbon synthesis products are produced ranging from methane to high boiling waxes. The majority of the compounds are also unsaturated and therefore it is necessary to employ a close degree of fractionation of the absorption oil to produce an oil which may be satisfactorily employed as the absorption medium. The presence of heavy ends in the absorption medium is particularly undesirable when refrigeration is to be employed in the absorption system while on the other hand, the initial boiling point of the absorption oil must be sufficiently high to limit vaporization losses when large volumes of gas are processed. Furthermore, it is undesirable for the absorption oil to be retained in the circulating system for any extended period of time because of the tendency toward polymerization with subsequent fouling of heat exchange equipment and inefficiency of absorption.

2

It is the principal object of the present invention to provide an effective and economic method of recovery of valuable hydrocarbons from synthesis tail gas without use of excessive quantities of circulating absorber oil, which is subject to the limitations enumerated above.

Another important object of the invention is to utilize the refrigeration potentialities of the tail gas from a hydrocarbon synthesis plant.

Other objects and advantages of the invention will become apparent from the description hereinafter.

Processing according to the present invention minimizes and overcomes to a great extent, the difficulties inherent in the prior art process of removing light hydrocarbons from tail gas by oil absorption. According to the present invention, the effluent or tail gases from a hydrocarbon synthesis plant are cooled in a manner described more fully below, the condensed material removed in a high-pressure separator, and the gases contacted with a finely divided adsorption medium, such as activated charcoal, employing the fluidized solids technique. The adsorbed material is then stripped from the adsorbent in a fluidized solids stripping zone and the resulting vapors are cooled and condensed hydrocarbons separated out. The uncondensed gases are now very rich in hydrocarbons and are passed to a small oil absorption system of conventional design.

The scrubbed gas from the fluid solids adsorption unit, and which is at a pressure only slightly lower than in the hydrocarbon synthesis reactor, is advantageously passed through expansion machines in a manner known per se to obtain power and refrigeration. This refrigeration may be used advantageously to cool the absorbing oil and the overhead from the fluid stripper, as well as the overhead stream from the reaction chamber before it enters the scrubbing system. By cooling in this way a larger amount of liquid is condensed out of the overhead gas and the scrubbing requirements are correspondingly less.

The invention will best be understood by referring to the accompanying diagrammatic representation of one modification of the present invention, wherein are presented suitable equipment and flow of material for carrying out a preferred embodiment of the present invention.

Referring now in detail to the drawing, which represents schematically a fluid solids hydrocarbon synthesis system and the combination fluidized solid and liquid absorption systems, 2 is a fluid solids synthesis reactor, containing a catalyst of a type suitable for the production of liquid hydrocarbons and oxygenated hydrocarbons from carbon monoxide and hydrogen. Iron catalysts as for example, reduced sintered pyrites ash or reduced sintered precipitated red iron oxide, promoted with oxides, carbonates or halides of alkali or alkaline earth metals may be used for the purpose.

Synthesis gas comprising hydrogen and carbon monoxide in the approximate ratio of 0.5–3 to 1 is introduced into reactor 2 through line 4. The reaction conditions within reactor 2 are those known for iron catalysts and may include temperatures of from about 550°–750° F. and pressures of about 250–750 p. s. i. g.

The total synthesis product and unreacted synthesis gases are withdrawn from reactor 2 through line 6 and passed through cooler 8 to separator 10 wherein the separation of liquids and gases, and of a hydrocarbon layer from an aqueous layer containing oxygenated materials is accomplished by settling. Cooling may be furnished in part as a result of the expansion of a portion of the tail gas as detailed more fully below. The liquid product may be withdrawn through line 12 for further processing in the liquid products recovery system in a manner known per se. The liquid products comprise the bulk of the $C_3+$ material produced in the synthesis reaction, as well as most of the water and oxygenated organic products. Cooler 8 is preferably maintained at such temperature levels that the condensation of hydrocarbons in the tail gas is at an economically feasible maximum. In accordance with the present invention, wherein part of the cooling in the system is supplied by the expansion of tail gas as described below, the temperature in cooler 8 and separator 10 is in the range of about 40° to 100° F.

From high pressure separator 10 the uncondensed gases are withdrawn through line 14 and that portion desired for recycle in reactor 2 passed via line 15 and booster 17 to feed gas line 4. The balance of this tail gas is passed into the lower conical portion of fluidized adsorption vessel 16. The latter is preferably in the form of a vertical cylinder with a conical base, having a grid or screen 18 to support the bed of fluidized adsorption medium and to provide suitable distribution for the gasiform fluidizing medium, here the tail gas. The vessel also may have an upper expanded section to aid in fines separation.

Within adsorber 16 a mass of finely subdivided solid adsorbent such as activated charcoal, having a particle size distribution such that the bulk of the particles pass through a 100 mesh screen and are in the range of 200–400 mesh, is maintained in the form of a dense turbulent mass, having a well-defined upper level 20. This adsorbent is supplied to an upper portion of vessel 16 from stripper vessel 26 through line 22 and cooler 24. In order to provide a countercurrent action between the adsorbent charcoal and the upflowing gasiform fluidizing medium, adsorber 16 preferably contains trays or packing material such as ceramic rings, or other inert material known in the art. The superficial velocity of the gas within adsorber 16 is preferably in the range of 0.5 to 3.0 feet/second, and is such as to maintain the finely divided adsorbent in a fluidized condition. The pressure within 16 is of the same order of magnitude or only slightly lower than that maintained in hydrocarbons synthesis reactor 2. To maintain as low a temperature as economically feasible within adsorber 16, in view of the exothermic nature of the adsorption process, not only is the incoming gas cooled in cooler 8, but also the stripped charcoal, as detailed more clearly below, prior to entering the top of adsorber 16 is preferably cooled in cooler 24, and the upper part of the adsorber may be employed as a cooler utilizing the heat carrying capacity of the scrubbed gases passing out of adsorber 16.

The gasiform fluidizing medium, which has now been scrubbed substantially free of hydrocarbons containing 3 or more carbon atoms, as well as of substantial quantities of its $C_2$ content, is now withdrawn upward from above the disperse phase above level 20 in adsorber 16. Adsorbent fines entrained by the upflowing gas stream are substantially removed in the expanded section of adsorber 16, where the gas velocity is sufficiently decreased so that the gas will no longer support any significant quantity of solids, and most of the entrained particles drop back into the fluidized mass below level 20. The scrubbed tail gas, which comprises unreacted synthesis gases, $CO_2$, $H_2O$, $N_2$ and hydrocarbons, primarily $C_1$ and $C_2$, is passed through gas-solids separating equipment, such as cyclone 28 equipped with dip-pipe 31 for returning fines to the solids bed. Final traces of solids may be removed, if desired, by a water scrubber (not shown) and the scrubbed gas may then be processed as detailed more fully below.

A stream of charcoal wherein are adsorbed hydrocarbons scrubbed from the tail gas may be continuously withdrawn from adsorber 16 through line 29, which extends into the fluid bed above grid 18. The solids are picked up by a stream of steam in line 30 and are conveyed via heater 32 to an upper portion of stripper vessel 26, which is preferably located in a position elevated in respect to adsorber 16. To aid in the conveyance of the solid through the lines, aeration fluid, such as for example, steam may be supplied through aeration taps 34.

Stripping vessel 26 is a tower of design similar to adsorber 16, comprising a lower conical and an upper expanded section, and supplied with distribution grid 36 and similarly containing trays or packing material to effect countercurrent flow of the solid material with respect to the stripping steam admitted through line 39. In stripper 26 fluidized conditions are maintained by maintaining an upward flow of the stripping medium at the superficial rate of about 0.5 to 3.0 feet/second, and stripping of the adsorbed hydrocarbons from the adsorption medium occurs while the latter is in the form of a dense fluidized bed. The pressure in stripper 26 is of the same order of magnitude as in adsorber 16, and the temperature such that substantially all of the adsorbed hydrocarbon material is desorbed by the steam. If desired, additional heat may be supplied to stripper 26 through external or internal steam coils (not shown).

Finely divided desorbed carbon particles are continuously withdrawn from the fluidized bed in stripper 26 through line 22, passed through cooler 24, and then to the upper section of adsorber 16 for further adsorption of hydrocarbons from hydrocarbon synthesis tail gas. The cooling in 24 and the heating in 32 may be accomplished in part by passing the respective stream in countercurrent heat exchange relationship.

From above the dense bed in stripper 26 steam and desorbed hydrocarbons are passed through a gas-solids separator, such as cylone 38 and thence the vapors are passed through line 40 and cooler 42 wherein condensation of steam and of relatively higher boiling hydrocarbons occurs. The mixture of liquids and uncondensed gases is then separated in separator 44. The lower aqueous layer may be withdrawn through line 46 and discarded, or, if desired, processed for recovery of oxygenated material it may contain, and the hydrocarbon layer passed via line 48 to the hydrocarbon recovery system for further processing, such as distillation, etc., in a manner known per se.

From separator 44 the uncondensed gases, now rich in hydrocarbons are withdrawn overhead through line 50 and passed to a small oil absorption system of conventional design. The gas may be passed through line 50 to a lower section of oil absorption tower 52, wherein it flows countercurrently to circulating lean oil previously stripped of absorbed hydrocarbons, which oil enters at the top of absorber 52. The latter may be equipped with bell-caps, baffles, or other contacting devices to aid in the contacting of the gas with the liquid absorbent. The fat oil comprising absorbed hydrocarbons is withdrawn from the bottom of absorber 52 through line 54, passed through exchanger 56 and heater 58 into stripping vessel 60 and the residual gas from which $C_3$ and higher hydrocarbons have substantially been scrubbed is withdrawn overhead from 52 and may be passed through line 62 to be added to the scrubbed gas from the solid adsorber 16 for further processing as below.

Through line 64 stripping steam is admitted to stripping vessel 60. Heat may be added at the bottom of vessel 60 by means of steam coils (not shown). Stripped hydrocarbon materials pass upward and together with steam are passed overhead from stripper 60 through line 66 to cooler 68, where steam and any higher boiling hydrocarbon constituents are condensed and are allowed to separate in separator 70. Water may be withdrawn through line 72 and discarded. The upper layer, comprising condensed hydrocarbons and any vaporized absorption oil may, if desired, be recycled in part to oil stripper 60 via line 74 and/or may be sent to the hydrocarbon processing system via lines 76 and 78 for further workup, as stabilizing, etc., in a manner known per se. Hydrocarbon gases uncondensed in cooler 68 may be further cooled in cooler 77 and separated in 79 and the condensate also be sent to the hydrocarbon processing system via line 78. Uncondensed gas is withdrawn via line 81 and may be used in any way desired, as for fuel or formation of synthesis gas by oxidation or reforming, etc.

From the lower portion of tower 60 lean oil is withdrawn through line 80 and passed via line 86, circulating pump 84, exchanger 56, and cooler 88 to oil absorber 52. Make-up or flushing oil may be admitted to the system if desired, through line 90 or absorption oil may be withdrawn from the system at this point.

To return to the scrubbed tail gas withdrawn from fluid solids adsorption unit 16, the gas is at only a slightly lower pressure than that which obtains in the hydrocarbon synthesis reactor 2. Thus if the synthesis reaction is carried out at about 400 p. s. i. g., the scrubbed gas passing overhead from adsorber 16 is at a pressure of about 385 p. s. i. g. In accordance with the present invention, the refrigerating potentialities of the scrubbed tail gas are utilized by passing at least a portion of the latter through expansion machines or turbines of conventional design. A portion of the scrubbed gases from absorbers 16 and 52 is passed through lines 92 and 94 to turbine expander 96, where the pressure in the gas is reduced sufficiently to effect a high degree of cooling of the gas without reaching the point where water freezes. Depending upon initial pressures this may involve the use of several expansion stages with intermediate heat exchange. This cooled gas then may be passed through line 98 to cooler 42, whereby, in passing in heat exchange relationship with the overhead product from the fluidized stripper 26, the products are condensed and separated in separator 44. Similarly, all or a portion of the cooled expanded gas stream may be passed in heat exchange relation with (a) the stripped fluidized adsorbent passing through line 22 from fluidized stripper 26 to fluidized adsorber 15; (b) the oil stream from oil stripper 60 to oil absorber 52; (c) the vapor stream leaving oil separator 70; (d) the overhead from synthesis reactor 2. The gas after heat exchange may then be utilized in any desired fashion, as recycle to the gas generation unit, reforming with steam and $CO_2$, or fuel. The gas may be used as outlined or it may be heat exchanged at essentially one location with a fluid and the cooled fluid circulated to the points indicated.

The amount of gas to be expanded and used for refrigeration purposes depends upon the setup and scheme of operation of any particular synthesis plant. Thus if synthesis gas is prepared by methane or natural gas reformation, it may be desirable to expand about 80% of the gases from the absorbers down to a pressure low enough to cool the gases to about 34° F. The other 20% may be passed, if desired, to the $CO_2$ scrubbing equipment in order to obtain the advantage of high pressure in the removal of $CO_2$. After removal of $CO_2$ this stream could also be expanded to obtain refrigeration. It is desirable in certain situations to recompress the scrubbed tail gas leaving the scrubber for reuse in the production of synthesis gas. However, any gas which must be purged to fuel in order to prevent the build-up of undesirable constituents, such as nitrogen, in the reaction system, is available for refrigeration.

Thus in accordance with this modification of the invention wherein a portion of the scrubbed tail gases is expanded and its refrigeration potentialities utilized, not only are large savings realized in the quantities of cooling water requirements, which may be dispensed with, but also by cooling in accordance with the present invention, a larger amount of liquid is condensed out of the overhead gases, markedly decreasing the charcoal and the oil scrubbing requirements.

The system illustrated by the drawing permits of many modifications obvious to those skilled in the art without deviating from the spirit of the invention. Thus in the embodiment of the invention described, only one fluid solids adsorption vessel 16 is shown. Additional adsorbers may be used in series or in parallel depending upon the requirements of the plant, the volumes of gas treated, etc. The processed gas may be used to move the activated carbon between the several fluidized adsorption towers if so desired. Also, tail gas expansion may be carried out in stages, with the partially expanded gas passing through heat exchangers between expansion stages. Also, other solid adsorbents, such as silica gel, may be employed in place of activated carbon in the fluid solids adsorption stage.

Furthermore, it may be desirable from time to time to withdraw charcoal or other adsorbent material from the fluidized adsorption unit for regeneration or reactivation purposes. Thus spent carbon may be withdrawn from the adsorption system through line 23. It may be reactivated by any process known in the art such as by treatment at elevated temperatures with oxidizing gases, etc., and the hot reactivated finely divided material may be returned to the system through line 27. Also, if desired, fresh finely divided activated carbon may be added through line 25.

It may also, under certain circumstances, be desirable to treat the desorbed activated carbon particles in line 22 prior to cooling in cooler 24 with an inert dehydrating gas from any convenient source in the system in order to decrease to any desired low value, the adsorbed water content of the carbon particles to be used in fluidized adsorber 16.

It is also to be understood that in the embodiment of the present invention wherein at least a portion of the cooling requirements of the system is furnished by the refrigeration obtained by expanding the scrubbed synthesis tail gases, such cooling is preferably supplementary to cooling by conventional means, such as by circulating water, etc. Thus when the expanded tail gases are employed for instance to furnish part of the cooling requirements for the total overhead from synthesis reactor 2 or from desorber 26, in cooling units 8 and 26 respectively, the hydrocarbon product is first cooled by conventional means and then subcooled by the expanded tail gas or by the refrigerated liquid produced therefrom, without an intermediate liquid product separation stage.

Thus by the process of the present invention, wherein a fluidized solids adsorption system is incorporated to aid in the removal of hydrocarbon material from synthesis tail gas, a decrease up to 90% or more of the normally required oil scrubbing requirements may be attained.

What is claimed is:

1. An improved process of economically recovering valuable hydrocarbons from the tail gases of the hydrocarbon synthesis reaction which comprises contacting carbon monoxide and hydrogen at synthesis conditions including pressures of from about 250 to 750 p. s. i. g. in synthesis proportions in a fluidized catalyst synthesis zone with a catalyst promoting the formation of normally liquid reaction products, cooling effluent gases from said fluidized solids hydrocarbon synthesis zone, passing cooled products to a gas-liquid separation zone, withdrawing from said separation zone a gas comprising uncondensed hydrocarbons normally liquid at atmospheric temperature, passing said gas to a fluidized solids adsorption zone, maintaining a pressure within said zone of approximately the same order of magniture as within the hydrocarbon synthesis zone, scrubbing said gas with finely divided activated carbon, withdrawing solids and adsorbed hydrocarbons downwardly from said adsorption zone, passing said material to a fluidized solids desorption zone, passing desorbed hydrocarbons to a cooling zone, condensing relatively high boiling hydrocarbons, passing uncondensed desorbed hydrocarbons to an oil absorption zone, absorbing normally condensable hydrocarbons in said zone, passing oil containing absorbed hydrocarbons to a stripping zone, recovering low molecular weight hydrocarbons from said zone, withdrawing scrubbed tail gas at superatmospheric pressures from said fluidized solids adsorption zone, passing said gas through an expansion zone, whereby said gas is expanded to atmospheric pressure and undergoes substantial cooling, and passing at least a portion of said cooled gas in heat exchange relationship with the effluent gases from said fluid solids desorption zone.

2. The process of claim 1 in which at least a portion of said cooled gas is passed in heat exchange relationship with the absorbing oil passing from said oil stripping zone to said oil absorption zone.

3. The process of claim 1 wherein scrubbed gases from said oil absorption zone are expanded, cooled, and circulated as coolant to the system.

4. The process of claim 1 wherein finely divided activated carbon particles flow downwardly countercurrent to said tail gases in said fluidized solids adsorption zone.

5. An improved process of economically recovering valuable hydrocarbons from the tail gases of the hydrocarbon synthesis reaction which comprises cooling effluent gases from a fluidized solids hydrocarbon synthesis zone, passing cooled products to a gas-liquid separation zone, withdrawing from said separation zone a gas comprising uncondensed hydrocarbons normally liquid at atmospheric temperature, passing said gas to a fluidized solids adsorption zone, maintaining a pressure within said zone of approximately the same order of magnitude as within the hydrocarbon synthesis zone, scrubbing said gas with finely divided solids adapted to adsorb hydrocarbon gases and vapors from gas streams, withdrawing solids and adsorbed hydrocarbons downwardly from said adsorption zone, passing said material to a fluidized solids desorption zone, passing desorbed hydrocarbons to a cooling zone, condensing relatively high boiling hydrocarbons, passing uncondensed desorbed hydrocarbons to an oil absorption zone, absorbing normally condensible hydrocarbons in said zone, passing oil containing absorbed hydrocarbons to a stripping zone, recovering low molecular weight hydrocarbons from said zone, withdrawing scrubbed tail gas at superatmospheric pressure from said fluidized solids adsorption zone, passing said gas through an expansion zone whereby said gas is expanded and undergoes substantial cooling and passing at least a portion of said cooled gas as coolant to the system.

6. The process of claim 5 wherein at least a portion of the cooling requirements of the hydrocarbon synthesis recovery system is provided by expanding scrubbed gases and circulating expanded gases to the system.

7. The process of claim 5 in which the pressures in the fluid solids adsorption zone and in the oil absorption zone are of the same order of magnitude as that obtaining in said hydrocarbon synthesis reaction zone.

WALTER G. SCHARMANN.

REFERENCES CITED

The following references are of record in the file of this patent:

UNITED STATES PATENTS

| Number | Name | Date |
|---|---|---|
| 1,846,206 | Kallam | Feb. 23, 1932 |
| 1,989,273 | Grimme et al. | Jan. 29, 1935 |
| 2,190,662 | Houdry | Feb. 20, 1940 |
| 2,270,903 | Rudbach | Jan. 27, 1942 |
| 2,347,682 | Gunness | May 2, 1942 |